(12) United States Patent
Xiang et al.

(10) Patent No.: US 11,599,554 B2
(45) Date of Patent: Mar. 7, 2023

(54) SYNCHRONIZING CHANGES TO STALE COMPONENTS OF A DISTRIBUTED OBJECT USING SYNCHRONIZATION BITMAPS

(71) Applicant: VMware, Inc., Palo Alto, CA (US)

(72) Inventors: Enning Xiang, San Jose, CA (US); Pascal Renauld, Palo Alto, CA (US); Sandeep Rangaswamy, Mountain View, CA (US); Xin Li, Fremont, CA (US); Yiqi Xu, Redwood City, CA (US); Venkata Ramanan, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 194 days.

(21) Appl. No.: 16/888,527

(22) Filed: May 29, 2020

(65) Prior Publication Data

US 2021/0374155 A1 Dec. 2, 2021

(51) Int. Cl.
*G06F 16/27* (2019.01)
*G06F 11/14* (2006.01)

(52) U.S. Cl.
CPC .......... *G06F 16/27* (2019.01); *G06F 11/1458* (2013.01); *G06F 2201/80* (2013.01)

(58) Field of Classification Search
CPC ...... G06F 16/27; G06F 16/273; G06F 16/275; G06F 16/278; G06F 11/1458; G06F 2201/80; G06F 11/1658; G06F 11/1662; G06F 11/2056; G06F 11/2058; G06F 11/2064; G06F 11/2066; G06F 11/2069; G06F 11/2074; G06F 11/2076; G06F 11/2082; G06F 11/2097; G06F 2201/855; G06F 16/178; G06F 16/1787; G06F 11/1471; G06F 11/1469; G06F 16/2358; G06F 3/0617; G06F 3/065; G06F 3/0619; G06F 11/2094; G06F 3/067; H04L 29/0854

See application file for complete search history.

(56) References Cited

U.S. PATENT DOCUMENTS 7,979,396 B1 * 7/2011 Krishnamurthy ....... G06F 16/27
707/655
8,818,943 B1 * 8/2014 McCline ............... G06F 16/275
707/624

(Continued)

*Primary Examiner* — Taelor Kim
(74) *Attorney, Agent, or Firm* — Barta, Jones & Foley, PLLC

(57) ABSTRACT

The disclosure herein describes tracking changes to a stale component using a synchronization bitmap. A first component of a plurality of mirrored components of the distributed data object becomes available from an unavailable state, and a stale log sequence number (LSN) and a last committed LSN are identified. A synchronization bitmap of the first component associated with a range of LSNs (e.g., from the stale LSN to the last committed LSN) is created and configured to track changes to data blocks of the first component. A second component is identified based on the second component including a tracking bitmap associated with an LSN that matches the stale LSN of the first component. The first component is synchronized with data from the second component based on, wherein the synchronizing includes updating the synchronization bitmap to track changes made to data blocks of the first component.

20 Claims, 9 Drawing Sheets

(56) References Cited

U.S. PATENT DOCUMENTS

| | | | | |
|---|---|---|---|---|
| 8,838,539 | B1* | 9/2014 | Ashcraft | H04L 67/01 |
| | | | | 707/637 |
| 9,507,843 | B1* | 11/2016 | Madhavarapu | G06F 16/2358 |
| 2008/0126443 | A1* | 5/2008 | Cochran | G06F 11/2082 |
| 2013/0138607 | A1* | 5/2013 | Bashyam | G06F 16/178 |
| | | | | 707/610 |
| 2015/0058306 | A1* | 2/2015 | Earl | G06F 16/1774 |
| | | | | 707/703 |
| 2018/0032257 | A1* | 2/2018 | Xiang | G06F 3/067 |
| 2018/0349233 | A1* | 12/2018 | Zaydman | G06F 11/1662 |
| 2019/0034505 | A1* | 1/2019 | Renauld | G06F 3/067 |
| 2019/0065092 | A1* | 2/2019 | Shah | G06F 3/0689 |
| 2021/0271691 | A1* | 9/2021 | Patil | G06F 11/2038 |

\* cited by examiner

US 11,599,554 B2

SYNCHRONIZING CHANGES TO STALE COMPONENTS OF A DISTRIBUTED OBJECT USING SYNCHRONIZATION BITMAPS

BACKGROUND

Distributed data objects can have multiple data components that are mirrored with each other to provide redundancy and security for the data stored thereon. Sometimes, a component becomes unavailable for a period and the data availability and durability of the distributed data object is reduced during that period. One or more changes to the data that are not recorded in the unavailable component cause the component to become stale, such that the component must be synchronized with other up-to-date mirrored components when it becomes available again. However, during the synchronization process of the stale component, tracking the changes to the stale component for use in future synchronization processes of other components may cause the tracking data to be corrupted due to changes, made during the synchronization process, occurring in a different order than the order in which the changes were made from the original data writes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solutions for enhancing the synchronization of components of a distributed data object using synchronization bitmaps are disclosed that include detecting, by a processor, a first component of a plurality of mirrored components of the distributed data object becoming available from an unavailable state, wherein the first component is stale with respect to at least one active component of the plurality of mirrored components; identifying, by the processor, a stale log sequence number (LSN) and a last committed LSN associated with the first component, wherein the stale LSN is an LSN associated with a write input/output instruction (I/O) that was committed by at least one active component of the plurality of mirrored components prior to the first component transitioning to the unavailable state, and wherein the last committed LSN is an LSN associated with a last write I/O that was committed to the first component prior to the first component transitioning to the unavailable state; creating, by the processor, a synchronization bitmap of the first component associated with an inclusive LSN range from the identified stale LSN to the identified last committed LSN, wherein the synchronization bitmap is configured to track changes to data blocks of the first component that occur after the first component becomes available; identifying, by the processor, a second component of the plurality of mirrored components based on the second component including a tracking bitmap associated with an LSN that is equal to or less than the stale LSN of the first component; and synchronizing, by the processor, the first component with data from the second component based on changed data blocks indicated in the tracking bitmap included in the second component, wherein the synchronizing includes updating the synchronization bitmap to track changes made to data blocks of the first component.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
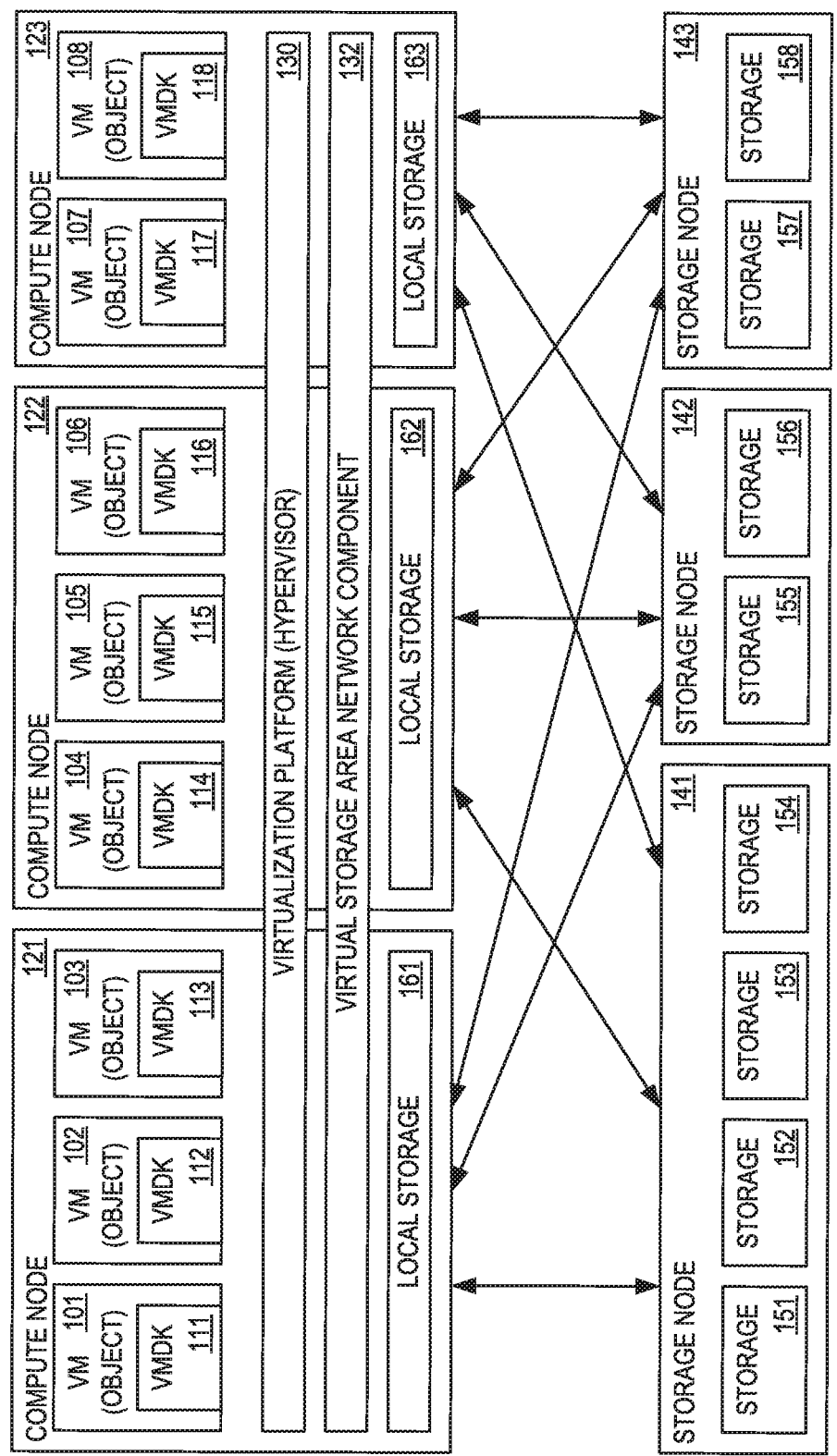
FIG. 1 is a block diagram illustrating a system architecture that is comprised of a set of compute nodes interconnected with each other and a set of storage nodes according to an embodiment.

Distributed data objects may be configured to store data spread out among multiple hardware devices and physical locations to both secure the data against loss due to hardware failure, software failure, or for other reasons (data durability), and to enable access to the stored data despite periodic downtimes for individual devices (data availability). Providing these features typically includes storing the data redundantly (e.g., storing the same data on multiple devices and/or in multiple locations) within data components of the distributed data object, such that, in the event that one server device fails, the data is still accessible on another server device that stores the data. For instance, data components of a distributed data object may include components configured to store a subset of the total data associated with the distributed data object, such that the total data is stored across multiple components and/or components that mirror each other. That is, the data of the distributed data object is stored redundantly on multiple components (e.g., the base components and mirrored components described herein). When a component of the distributed data object is going to become unavailable, the data durability and availability is reduced for the time period during which the component is unavailable and, when the component becomes available again, it may be in a stale state and require synchronization with an up-to-date component.

In the described distributed data object systems, a tracking bitmap mechanism includes the process of each active mirrored component starting a new tracking bitmap when another mirrored component goes offline or otherwise becomes unavailable. The tracking bitmap is managed by each local component independently and changes are marked into the bitmap when data changes are committed by the local component. Each bitmap tracks every incoming data write to the component since the last committed write input/output (I/O) at the time and the log sequence number (LSN) of that write I/O is associated with the bitmap as the starting LSN.

When an unavailable component becomes available again and is stale, a synchronization bitmap is started on the stale component, as described herein. This synchronization bitmap enables the stale component to rebuild the change tracking information associated with the write I/Os that were missed by the stale component during the downtime. Once that change tracking information is rebuilt, the synchronization bitmap of the stale component may be used during synchronization processes of other components that went offline during or around the time that the stale component was unavailable.

Aspects of the disclosure provide a computerized method and system for tracking the synchronization of stale components using synchronization bitmaps. When a stale component becomes available after being unavailable for a period, a synchronization bitmap is created for the stale component and associated with the stale LSN and/or the last committed LSN associated with the stale component. The synchronization bitmap is configured to track changes to the stale component during a synchronization process, as well as changes to the stale component from other write I/Os. Then, an available component is identified and selected for use during the synchronization process of the stale component. The selected component includes a tracking bitmap (or another synchronization bitmap) that is associated with an LSN that matches the stale LSN of the stale component. The data blocks of the stale component are synchronized with data blocks of the selected component based on the tracking bitmap of the selected component, and the changes made during the process are recorded in the synchronization bitmap of the stale component.

The disclosure addresses the challenges, among others, of maintaining data durability and availability during and after downtime of data components of a distributed data object. The described methods and systems operate in an unconventional way by using a synchronization bitmap to track changes to a stale component during a synchronization process, enhancing the redundancy of the recorded change information in the distributed data object to components that are in the process of being synchronized. Further, corruption of data due to recovery writes during synchronizations occurring in different orders and not including LSN information is reduced or eliminated. Additionally, the use of synchronization bitmaps may reduce the use of processing and storage resources associated with creating new tracking bitmaps, as the synchronization bitmaps created during synchronization enable the component to refrain from creating new tracking bitmaps when other components become unavailable as described herein. Also, the use of synchronization bitmaps enables increased flexibility for the distributed data object when identifying components to use in future synchronizations, as a component with a synchronization bitmap includes recorded change information sufficient to synchronize any mirrored components that became unavailable during the downtime of the component with the synchronization bitmap.

FIG. 1 is a block diagram illustrating a system architecture 100 that is comprised of a set of compute nodes 121-123 interconnected with each other and a set of storage nodes 141-143 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108.

In some examples, various components of architecture 100, for example compute nodes 121, 122, and 123, and storage nodes 141, 142, and 143 are implemented using one or more computing apparatuses 1018 of FIG. 10.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

Thin-provisioning may be used, and in some examples, storage nodes 141-143 do not require significantly more processing power than is needed for handling I/O traffic. This arrangement may be less expensive than in an alternative hyperconverged environment in which all of storage nodes 141-143 have the same or similar processing capability as compute node 121. Using the disclosure, compute nodes 121-123 are able to operate with a wide range of storage options.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object.

Virtual SAN component 132 permits objects 101 and 102 to write incoming data from object 101 and incoming data from object 102 to storage nodes 141, 142, and/or 143, in part, by virtualizing the physical storage components of the storage nodes.

FIGS. 2A-D are block diagrams illustrating a system 200A-D configured for managing mirrored data components (e.g., base component 204 and mirrored component 206) of a distributed data object 202 when some data components are unavailable or stale according to an embodiment. In some examples, the system 200A-D of FIGS. 2A-D is implemented on a component or components of a system architecture such as system architecture 100 of FIG. 1. For instance, in some examples, the distributed data object 202 is part of a virtual storage network component or virtual SAN component 132 of FIG. 1 as described above.

Figure 2A:
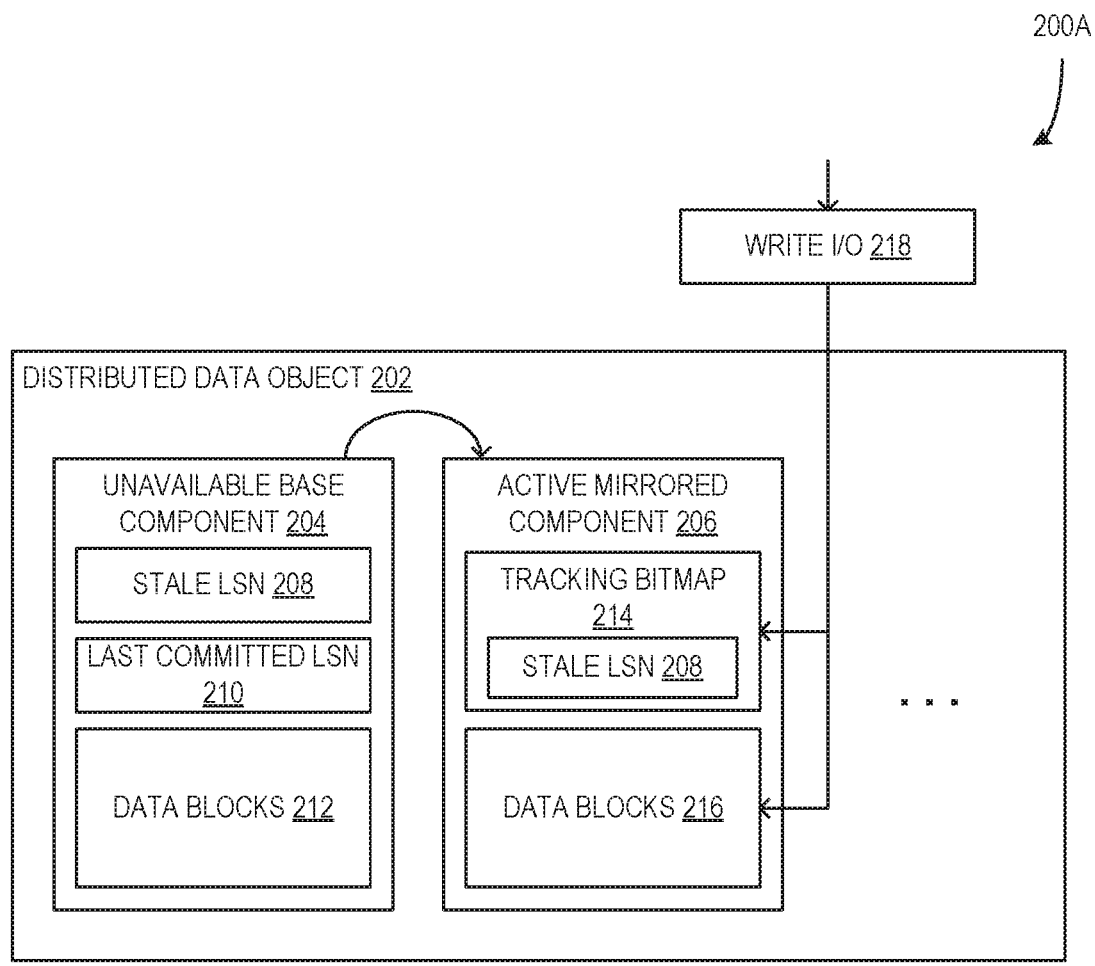
FIGS. 2A-D are block diagrams illustrating a system configured for managing mirrored data components of a distributed data object when some data components are unavailable or stale according to an embodiment.

FIG. 2A is a block diagram 200A illustrating a state of the distributed data object 202 when the base component 204 is unavailable and the mirrored component 206 is active. The distributed data object 202 is configured to store data across a plurality of data components (data structures configured to store at least a portion of the total data associated with the distributed data object 202), such as the base component 204 and the mirrored component 206. In some examples, the distributed data object 202 stores data redundantly across multiple components. For instance, multiple copies of a set of data may be stored on each of the base component 204 and the mirrored component 206, such that the data is preserved in the event that one or some of the components fail. The distributed data object 202 may be configured to provide enhanced reliability and availability of the stored data through the redundant storage of data on the multiple components, enabling the data to be accessed despite failure or unavailability of individual components.

While the base component 204 is labeled differently from mirrored component 206, in other examples, the base component 204 is effectively identical to the mirrored components 206. Further, the described functionality may also apply to components of the distributed data object 202 other than the base component 204 and or associated mirrored components in other examples. Further, while the FIGS. 2A-D each illustrate two components of the distributed data object 202 in other examples, the distributed data object 202 may include more and/or different components without departing from the description herein. For instance, the distributed data object 202 may be configured to include four or greater mirrored components to enhance the data durability and security of the distributed data object 202.

As illustrated in FIG. 2A, the base component 204 is unavailable. The base component may have become unavailable due to failure of an associated host and/or network connection, the associated host being deactivated for maintenance, or another reason. When it is detected that the base component 204 is unavailable, the active mirrored component 206, which is configured to store the same data as the base component 204, is configured to begin tracking changes to the data of the address space that the base component 204 and mirrored component 206 share (e.g., the data blocks 212 and 216 respectively), such that the tracked changes can be used to bring the base component 204 up to date through a synchronization process if and/or when it becomes available again.

Changes to the data stored in the components 204 and 206 are in the form of I/O instructions, commands, or messages that write data values to data addresses within the shared address space of the components 204 and 206. Such I/O instructions may be known as "write I/O" (e.g., write I/O 218). Each instance of write I/O is assigned a log sequence number (LSN) by the system, which provides sequencing information that is used for a variety of operations within the distributed data object and/or associated components (e.g., synchronization of mirrored components as described herein).

When the base component 204 becomes unavailable, it is associated with a stale LSN 208 and a last committed LSN 210. The stale LSN 208 is the LSN of the write I/O that is the last write I/O committed on all active mirrored components. While the stale LSN 208 is shown in the base component 204, in some examples, the stale LSN of the base component 204 based on its unavailability may be determined by other active mirrored components, such as mirrored component 206, rather than by the base component 204, which may have become unavailable suddenly due to a hardware failure or the like. In some examples, a stale LSN of a component that has become unavailable is persisted or otherwise provided for use by other active mirrored components in creating and maintaining tracking bitmaps and/or performing or otherwise participating in synchronization of associated stale components. Additionally, the unavailable base component 204 is associated with a last committed LSN 210, which indicates the LSN of the last write I/O that was committed to the base component 204 specifically. In some cases, the stale LSN 208 and the last committed LSN 210 are the same value, but in other cases, based on the timing of the base component 204 becoming unavailable, it is possible that the base component 204 committed one or more additional write I/Os (prior to becoming unavailable) that the active mirrored components had not committed at the time of the base component 204's unavailability determination. The example described with respect to FIG. 3 below illustrates such a case.

Based on the unavailability of the base component 204, the active mirrored component 206 is configured to create a tracking bitmap 214 associated with the stale LSN 208 of the base component 204, and to use it to track changes made to the data blocks 216 while the base component 204 is unavailable. By tracking which data blocks of data blocks 216 are changed during the downtime of the base component 204, the base component 204 is brought up to date by synchronizing only those changed data blocks as indicated in the tracking bitmap 214. In some examples, the tracking bitmap 214 is configured to include a plurality of data bits with each data bit mapping to an individual data block within the address space of the component. The data bits of the tracking bitmap may be initialized to '0' and, upon write I/Os (e.g., write I/O 218) causing data in a data block to change, the associated component updates the mapped data bit of the data block to be a '1', indicating that that data block will need to be provided to the base component 204 to bring it up to date later. As illustrated, the write I/O 218 represents one or more write I/O's that are provided to the distributed data object 202 and specifically targeted at the address space with which the base component 204 and the mirrored component 206 are associated. The write I/O 218 is provided to the distributed data object 202 and causes changes to be made to one or more data blocks of the data blocks 216 of the active mirrored component 206 (and any other active mirrored components associated with the address space). The bits in the tracking bitmap 214 associated with the one or more data blocks that are changed are set to a value indicating that the data blocks have been changed. As shown, the tracking bitmap 214 is associated with the stale LSN 208 of the unavailable base component 204, such that the components are enabled to identify it as a tracking bitmap that indicates all the changes made to data blocks in the address space since the write I/O associated with the stale LSN 208 was committed to the base component 204 and the mirrored component 206.

Figure 2B:
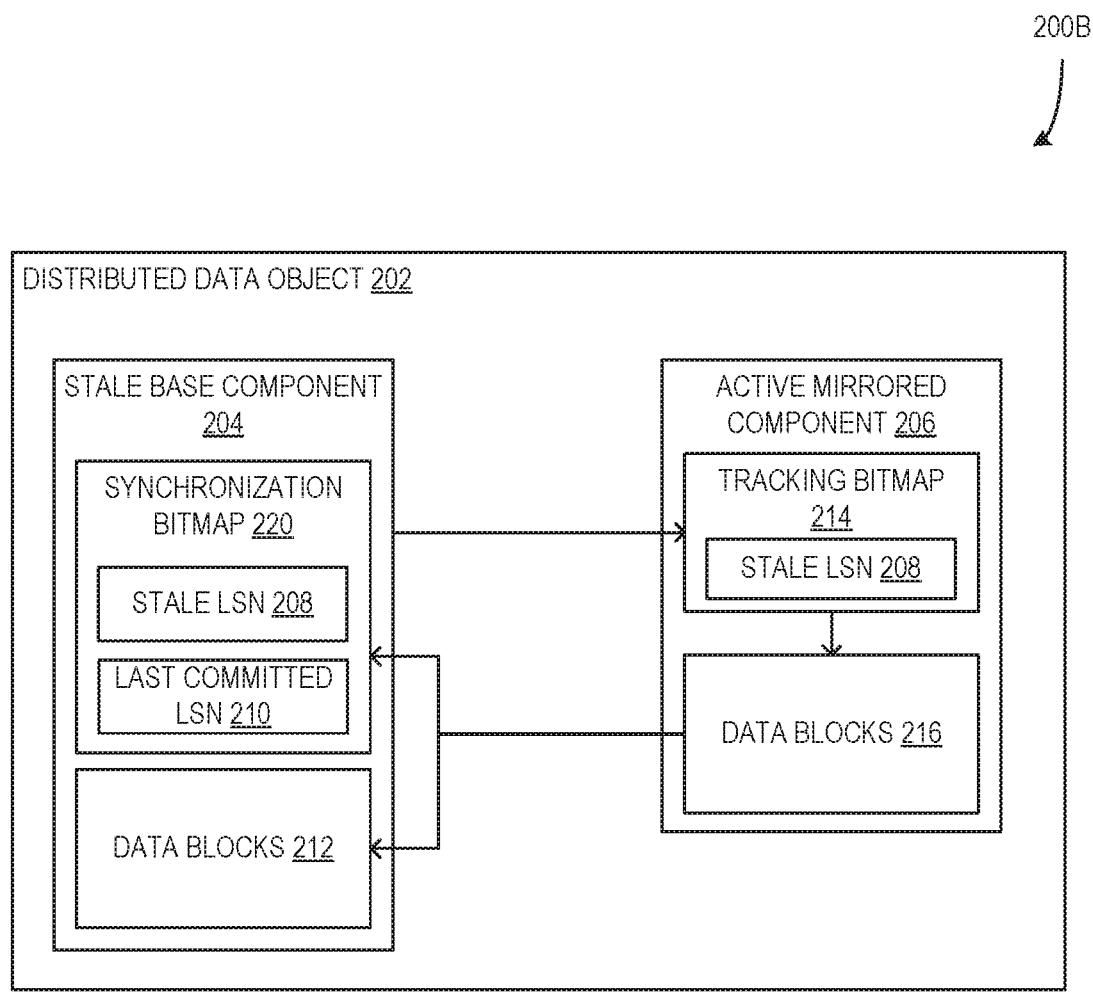

FIG. 2B is a block diagram 200B illustrating a state of the distributed data object 202 when the base component 204 has become available and is stale (the component is available but is not synchronized with other up-to-date mirrored components) and the mirrored component 206 is active. When the base component 204 becomes available (e.g., it comes back online after an associated host device is restarted after a failure or maintenance period), the base component 204, or an associated component associated with the distributed data object 202, creates a synchronization bitmap 220 in or otherwise associated with the base component 204. The synchronization bitmap 220 includes the stale LSN 208 and the last committed LSN 210 of the base component 204, which may be used during future synchronization operations as described herein. Similar to the stale LSN 208 associated with the tracking bitmap 214, the stale LSN 208 and last committed LSN 210 associated with the synchronization bitmap 220 indicate a point in time after which the changes tracked in the synchronization bitmap 220 occurred, relative to the LSNs of write I/Os. For instance, if the stale LSN 208 of the synchronization bitmap 220 is 50, that would indicate that the changes tracked in the synchronization bitmap 220 are associated with write I/O's with LSNs of 51 or greater that originally occurred after the write I/O associated with LSN 50.

The synchronization bitmap 220 is configured to function in a similar manner as the tracking bitmap 214 and/or other tracking bitmaps, as described above. For instance, in some examples, the synchronization bitmap 220 includes a plurality of bits with each bit being associated with a data block of the data blocks 212 and, when data of a data block is changed, the bit associated with that data block is set to indicate that it has been changed. However, the synchronization bitmap 220 differs from the tracking bitmap 214 in that it is configured to track "recovery writes" that occur when the stale base component 204 is being brought back up to date by synchronizing at least a portion of data blocks 212 with equivalent data blocks of data blocks 216 of the active mirrored component 206.

As illustrated, when the stale base component 204 becomes available and creates the synchronization bitmap 220, an active mirrored component (e.g., mirrored component 206) that is not stale and that is associated with a tracking bitmap with a stale LSN that matches the stale LSN of the stale component is identified. The data of the stale component is synchronized with data of the identified active mirrored component. As illustrated in diagram FIG. 2B, the mirrored component 206 includes a tracking bitmap 214 with a stale LSN 208 that matches the stale LSN 208 of the base component 204. In some examples, there may be multiple mirrored components with matching tracking bitmaps and the mirrored component to be used in the synchronization process may be selected by the system based on a defined selection process without departing from the description herein.

After mirrored component 206 is selected to be used in the synchronization process for the base component 204, data blocks to be copied from the data blocks 216 of the mirrored component 206 to the data blocks 212 of the base component 204 are identified based on the bits that are set in the tracking bitmap 214 to indicate that the associated data blocks have been changed since the write I/O associated with the stale LSN 208 has been committed. Those identified data blocks are copied to the equivalent data blocks in the data blocks 212 using recovery write operations or recovery writes. In some examples, recovery writes are similar to other write I/O in that they include writing to address locations in the data blocks of a component in order to change, organize, and/or store data values, but recovery writes are used to synchronize components within the distributed data object 202 as described herein, rather than being received from outside the object 202 from other sources. Further, recovery writes may not be associated with LSNs and the sequence in which recovery writes occur may not match the sequence of the write I/Os that originally caused the changes to data blocks that are being synchronized by the recovery writes. For instance, the synchronization of the data blocks 212 with data blocks 216 (by copying changed data blocks from data blocks 216 to data blocks 212) may be performed in address order (e.g., the changed data block with the lowest address is copied first, then the changed data block with the second lowest address, etc.). Other sequences of recovery writes may also be used during the synchronization process without departing from the description herein.

As the changed data blocks are copied from data blocks 216 to data blocks 212, the associated bits in the synchronization bitmap 220 are set to indicate the changes to the data blocks 212, thereby tracking all changes made during the synchronization process. As a result, the base component 204 is brought up to date from being stale and it has access to a record of all changes made to the address space since the write I/O associated with the stale LSN 208 was committed prior to its unavailability. This change record tracked in the synchronization bitmap 220 may be used when other mirrored components need to be synchronized to be brought up to date, as described herein.

Figure 2C:
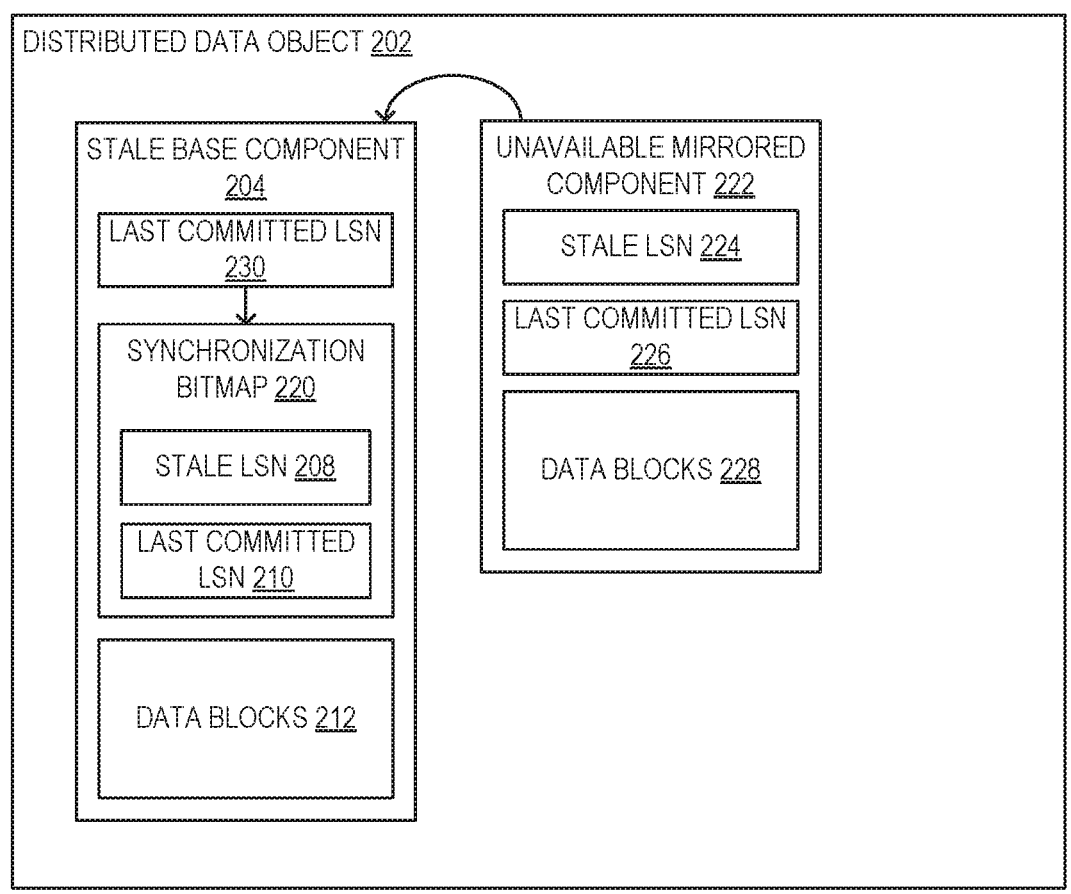

FIG. 2C is a block diagram 200C illustrating a state of the distributed data object 202 when the base component 204 has become available and is stale (the component is available but is not synchronized with other up-to-date mirrored components), and a mirrored component 222 has become unavailable. Further, based on the mirrored component 222 becoming unavailable, a stale LSN 224 (e.g., the last write I/O committed to the active mirrored components of the component 222) and last committed LSN 226 (e.g., the last write I/O committed to the mirrored component 222 specifically) are determined in association with the mirrored component 222. In some examples, the unavailable mirrored component 222 is a different mirrored component than the mirrored component 206 that is used in the synchronization process described above with the base component 204. Alternatively, in other examples, the mirrored component 222 may be the same component as the mirrored component 206. However, in such a case, if the synchronization process of the stale base component 204 is not complete when the mirrored component 222 becomes unavailable, the synchronization process may fail and a new synchronization process may be initiated between the base component 204 and another active mirrored component that includes a matching tracking bitmap as described herein.

When the mirrored component 222 becomes unavailable, the process of creating necessary tracking bitmaps on other mirrored components is triggered, as described above with respect to mirrored component 206 in FIG. 2A. On one or more active mirrored components, a tracking bitmap associated with the stale LSN 224 of the mirrored component 222 may be created. With respect to the base component 204, which may still be stale and in a synchronization process, it is determined whether the synchronization bitmap 220 is sufficient for a future synchronization of the mirrored component 222 or another tracking bitmap should be created. The determination is based on the state of the base component 204 and based on a comparison of the current last committed LSN 230 to the last committed LSN 210 associated with the synchronization bitmap 220. In some examples, no new tracking bitmap is created at the base component 204 when the current last committed LSN 230 of the base component 204 is within the range of the stale LSN 208 and last committed LSN 210 of the synchronization bitmap 220. The synchronization bitmap 220 is configured to track a complete set of recovery writes of changes made after the stale LSN 208, such that creation of an additional tracking bitmap is unnecessary and may result in data inconsistency due to the possibility of a portion of the recovery writes not being tracked in the new tracking bitmap. So, the synchronization bitmap 220 includes tracked changes that make it reliable for use in synchronizing any mirror components that become unavailable while the base component 204 is offline and/or while the base component 204 is being synchronized to bring it up to date, including the mirror component 222, which became unavailable during the synchronization process of the base component 204 in the illustrated example. In some examples, new write I/O is not sent to a stale component while it is stale (other than the recovery writes associated with synchronizing the stale I/O to bring it up to date). So, write I/O that is not a recovery write will not be logged in the synchronization bitmap 220 until after the synchronization process is complete and the base component 204 transitions from a stale state to an active state and begins to be sent new write I/O.

Additionally, or alternatively, after the base component 204 has been brought up to date and the synchronization process described in FIG. 2B is complete and the base component 204 has committed a write I/O since the completion of the synchronization process (e.g., the last committed LSN 230 of the base component 204 exceeds the last committed LSN 210 of the synchronization bitmap 220), the base component 204 may be configured to create tracking bitmaps as described above with respect to mirrored component 206 in FIG. 2A. For instance, the base component 204 may revert to the described tracking bitmap behavior after it is active (available and not stale due to completion of the synchronization process) and has processed additional write I/O(s). In some examples, tracking bitmaps and/or synchronization bitmaps as described herein are deleted or otherwise removed when the stale components who's stale LSNs are in the LSN ranges of the bitmaps have become active again (e.g., synchronized with other active components such that they are no longer stale). For instance, if all the components of a distributed data object are in an active state, all existing tracking bitmaps and synchronization bitmaps may be removed.

Figure 2D:
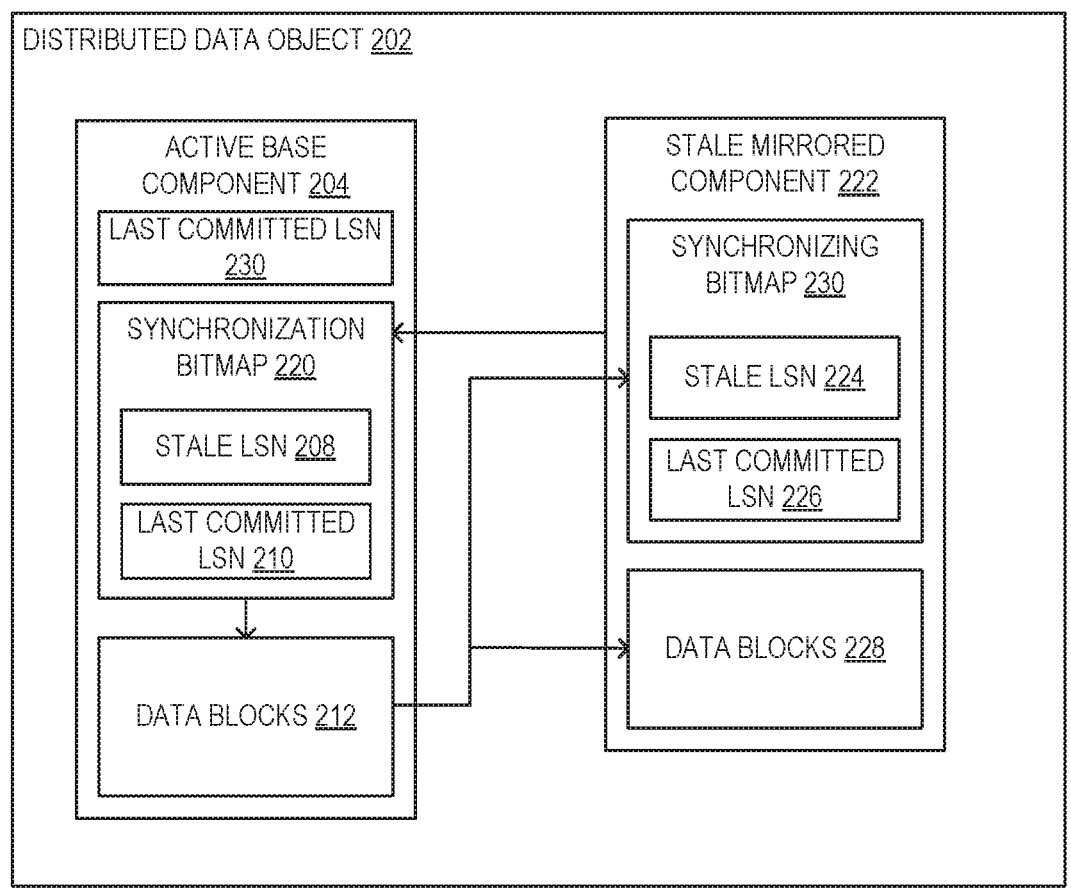

FIG. 2D is a block diagram 200D illustrating a state of the distributed data object 202 when the base component 204 has is active (the component is available and is up to date and synchronized with one or more other active mirrored components) and the mirrored component 222 that was unavailable has become available and stale. The diagram 200D illustrates the stale mirrored component 222 being brought up to date through a synchronization process based on the synchronization bitmap 220 of the base component 204 in combination with the data of data blocks 212, similar to the synchronization process of the base component 204 and mirrored component 206 described above with respect to FIG. 2B.

Upon the mirrored component 222 becoming available, it is determined to be stale and an associated synchronization bitmap 230 is created. The synchronization bitmap 230 is associated with the stale LSN 224 and last committed LSN 226, which were determined when the mirrored component 222 became unavailable previously. The synchronization bitmap 220 may be identified and selected as bitmap to be used to bring the mirrored component 222 up to date. For instance, if the stale LSN 208 matches the stale LSN 224 of the mirrored component 222, the synchronization bitmap 220 may be identified as a bitmap that can be used during a synchronization process of mirrored component 222. Alternatively, the synchronization bitmap 220 may also be identified if the stale LSN 224 of the mirrored component 222 is larger than the stale LSN 208 of the synchronization bitmap 220 if there are no other available tracking bitmaps or synchronization bitmaps associated with active mirrored components of the distributed data object 202 that include matching stale LSNs.

Based on the synchronization bitmap 220 being identified and selected for use in a synchronization process for the mirrored component 222, data blocks of the data blocks 212 that are indicated to include changes in the synchronization bitmap 220 are identified and copied to the equivalent data blocks of the data blocks 228 of the mirrored component 222. Further, the data blocks of data blocks 228 to which changes are made during the synchronization process are tracked in the synchronization bitmap 230 by setting bits associated with the data blocks to indicate that changes have been made. This synchronization process may be performed in a substantially similar manner as the synchronization process described above with respect to FIG. 2B.

Figure 3:
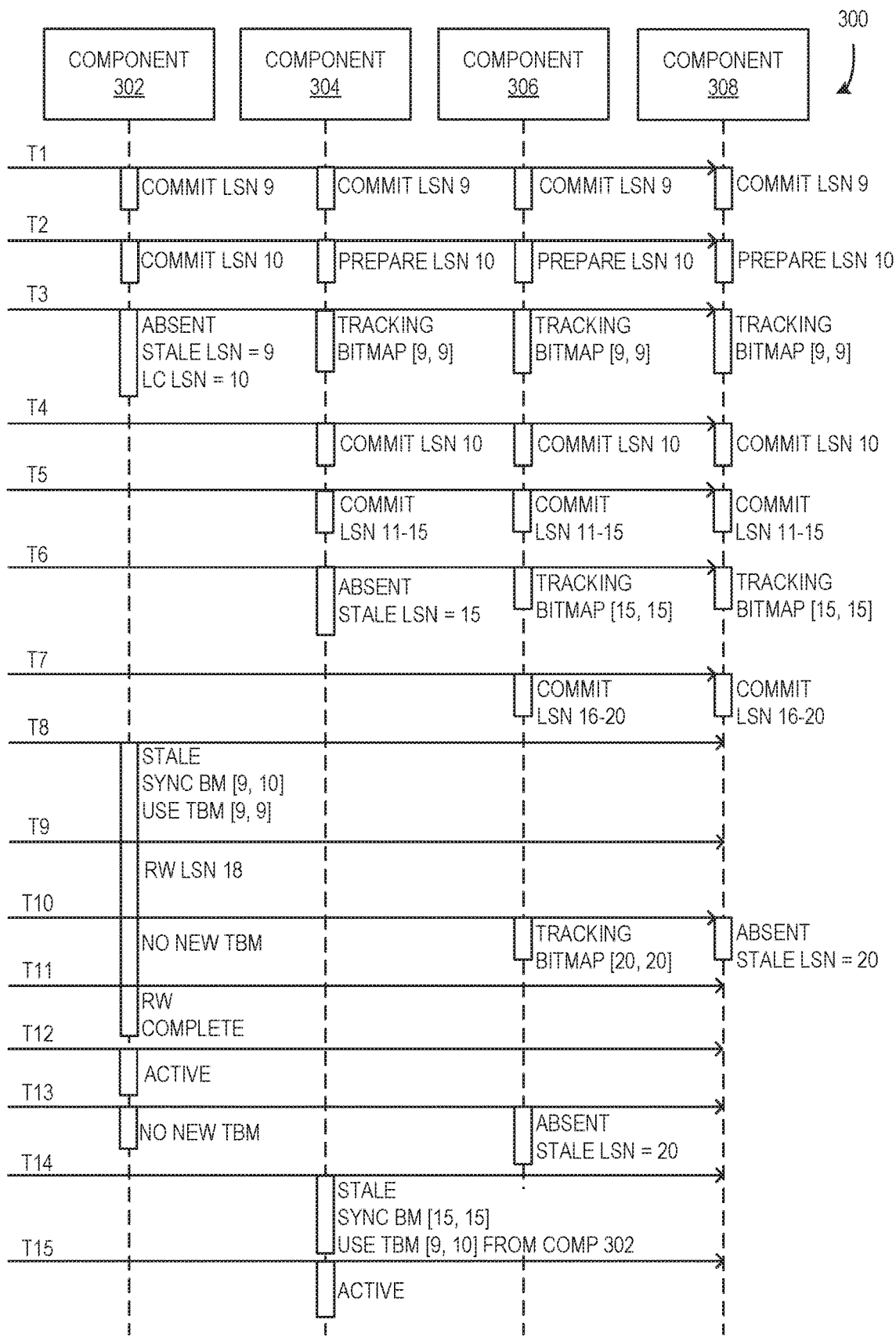
FIG. 3 is a sequence diagram illustrating a process of managing unavailable components in a distributed data object using synchronization bitmaps according to an embodiment.

FIG. 3 is a sequence diagram illustrating a process 300 of managing unavailable components in a distributed data object using synchronization bitmaps according to an embodiment. In some examples, the illustrated process is performed and/or executed by a component or components of a system such as system 100 of FIG. 1 and/or systems 200A-200D of FIGS. 2A-D, respectively. The process 300 as illustrated includes operations and/or events associated with mirrored components 302, 304, 306, and 308 of a distributed data object. The mirrored components 302, 304, 306, and 308 are configured to mirror each other (e.g., each component stores data in data blocks associated with the same address space and/or range). Further, the process 300 is represented by a plurality of points in time and/or periods of time T1-T15.

At T1, a write I/O assigned an LSN of 9 is committed to each of the components 302-308. In some examples, write I/Os are committed to the components 302-308 according to a protocol that includes preparing the write I/O and committing the write I/O, such as a two-phase commit (2PC) protocol or another type of atomic commit protocol. Alternatively, or additionally, the write I/Os may be committed to the components 302-308 with another protocol or method without departing from the description herein.

At T2, a write I/O assigned an LSN of 10 is prepared at all four components 302-308 but it is only committed at component 302 before acknowledging back to the system. In some examples, the component 302 records or otherwise tracks that the LSN 10 write I/O has been committed, but the other components and/or other parts of the system may not have access to that information.

At T3, the component 302 goes absent, or becomes unavailable. In some examples, the component 302 goes offline such that other components of the system are unable to communicate or interact with the component 302. This may be caused by, for instance, a host device associated with the component 302 malfunctioning, losing network connectivity, transitioning to a maintenance mode, or the like. A stale LSN of 9 is associated with the component 302, representing the last write I/O that was committed by all the active components 302-308 prior to the component 302 becoming unavailable. Further, the component 302 is associated with a last committed LSN of 10, though the write I/O associated with LSN 10 was not committed to any of the other components 304-308.

Additionally, based on the system detecting the unavailability of the component 302, tracking bitmaps (also referred to as TBMs in FIG. 3) are created in association with each of the remaining active mirrored components 304-308. Each of the created tracking bitmaps is associated with the determined stale LSN value of 9 to indicate the starting point at which write I/O and/or other changes are tracked by the tracking bitmaps. Additionally, or alternatively, the created tracking bitmaps may be associated with an LSN range from the stale LSN to the last committed LSN of the unavailable component 302, as described above with respect to synchronization bitmaps 220 and 230 of FIGS. 2B-2D (also referred to as sync BMs in FIG. 3). In cases where the stale LSN and last committed LSN are different values, associated the tracking bitmap with the range of the two values may be used to determine whether the tracking bitmap should be selected for use in a synchronization process as described herein.

At T4, the write I/O associated with LSN 10 is committed to each of the components 304-308. The committing of the write I/O includes writing data to one or more data blocks of each component 304-308 and, as a result, the tracking bitmaps that were created at T3 are updated such that the bits associated with the changed data blocks are set to indicate that the data blocks have been changed since the stale LSN of 9 of the tracking bitmaps.

At T5, write I/Os associated with LSNs 11, 12, 13, 14, and 15 are committed to each of the components 304-308 that are active. Further, the changes made during the committing of those write I/Os are tracked in the tracking bitmaps associated with a stale LSN of 9 of each of the components 304-308. Because the component 302 remains unavailable, the data writes associated with the write I/Os of LSNs 11-15 are not performed on the data blocks of the component 302, such that it is now out of sync or out of date with respect to the other mirrored components 304-308.

At T6, the component 304 goes absent, or becomes unavailable. The stale LSN of 15 is associated with the unavailable component 304 based on the last write I/O that was committed to all the active mirrored components prior to the system detecting that the component 304 was unavailable. As with the unavailability of the component 302, tracking bitmaps that are associated with each of the remaining active mirrored components 306 and 308 are created and assigned a stale LSN of 15 based on the stale LSN of the component 304. Further, the tracking bitmaps may be associated with an LSN range as described above, but in this case, the stale LSN and last committed LSN associated with the component 304 are both 15.

At T7, write I/Os associated LSNs of 16-20 are committed to the remaining active mirrored components 306-308. Further, based on the data changed by those write I/Os in the address space of the mirrored components, the tracking bitmaps associated with the stale LSN of 9 (e.g., created when component 302 became unavailable) and the stale LSN of 15 (e.g., created when the component 304 became unavailable) are both updated to indicate the data blocks that were changed by the write I/Os associated with LSNs 16-20.

At T8, component 302 becomes available again. Because its stale LSN is 9 and write I/Os with LSNs up to 20 have been committed on other active mirrored components 306 and 308, component 302 is in a stale state. To enable changes made during the upcoming synchronization process to be tracked, a synchronization bitmap is created for the component 302 and it is associated with the LSN range from the stale LSN 9 to the last committed LSN 10 of the component 302. Then, a tracking bitmap and associated mirrored component is identified and selected to be used in the synchronization process to bring the component 302 up to date. In this case, one of the tracking bitmaps associated with the stale LSN of 9 is identified and selected, such as the tracking bitmap of the component 306. In other examples, the tracking bitmap of the component 308 may also be selected without departing from the description. The tracking bitmap is used to determine the synchronization workload, including identifying data blocks of the component 306 that have been changed since the write I/O associated with LSN 9. Then those identified data blocks are copied to the equivalent data blocks of the component 302 using recovery write operations as described herein.

The synchronization process of the component 302 may take significant time, especially if the write I/Os that the component 302 missed out on changed many different data blocks. As illustrated, the synchronization process takes from where it starts at T8 until the recovery writes are complete at T11. For instance, at T9, a recovery write, associated with a change or changes made based on the write I/O associated with LSN 18, is performed on the data blocks of the component 302.

At T10, the component 308 goes absent, or becomes unavailable, and is associated with a stale LSN of 20. A new tracking bitmap associated with the mirrored component 306 is created and associated with the stale LSN of 20 and/or an LSN range from the stale LSN of 20 to the last committed LSN of 20 as described herein. Further, it is determined whether to create a new tracking bitmap in association with the component 302, which is still stale and being updated during the synchronization process. Because the last committed LSN of the component 302 remains 10, which is within the assigned LSN range of the synchronization bitmap of the component 302, it is determined that no new tracking bitmap should be created and that the synchronization bitmap created when the component 302 came back online is effective for tracking changes during the unavailability of the component 308.

In an alternative example, if a new tracking bitmap were created for the component 302 based on the unavailability of component 308 during the synchronization process, where recovery writes are being performed on the component 302 to bring it up to date, it is possible that the new tracking bitmap may fail to track changes that occur during the synchronization process but before the new tracking bitmap is created. As a result, data corruption may occur if the new tracking bitmap is later used in a synchronization process of another component as described herein. This is at least one reason why synchronization bitmaps such as synchronization bitmap 220 of FIGS. 2B-D are created immediately upon a component becoming available and then used to track all changes that occur to the component over the course of the synchronization process and any other associated changes.

At T11, all the recovery writes of the component 302 are completed and, at T12, as a result of the synchronization process being finished, the component 302 returns to an active state, indicating that the component 302 is available and up to date with other active mirrored components of the distributed data object. However, the component 302 continues to maintain the synchronization bitmap that was created prior to the synchronization process, as it includes a complete record of changes to the address space since the stale LSN that was first associated with the component 302 when it became unavailable at T3.

At T13, the component 306 goes absent, or becomes unavailable, and is associated with a stale LSN of 20. Only component 302 is active of the initial components 302-308, and it is determined whether to create a new tracking bitmap for use by the component 302 to track changes during the downtime of component 306. Because the last committed LSN to the component 302 is still 10, which is in the range of the synchronization bitmap (LSNs 9-10), no new tracking bitmap is created and the component 302 continues to maintain the synchronization bitmap. Alternatively, if another write I/O (e.g., with an LSN of 21) is committed to the component 302 immediately prior to T13, when the component 306 goes absent, a new tracking bitmap associated with a stale LSN of 21 would be created for the component 302 because the last committed LSN of the component 302 is now 21, which is outside the LSN range of the synchronization bitmap.

At T14, the component 304 becomes available and is in a stale state. Based on becoming available, a synchronization bitmap is created for the component 304 that is associated with an LSN range of the stale LSN of 15 and the last committed LSN of 15 of the component 304. Then, a tracking bitmap or synchronization bitmap that can be used to bring the component 304 up to date is identified and selected. Only the component 302 is in an active state, so the synchronization bitmap associated with the LSN range of [9, 10], that was created for the component 302 when it became available at T8, is identified and selected for use in bringing the component 304 up to date. The data blocks of the component 302 that are indicated to have been changed in the synchronization bitmap of the component 302 are then identified and copied to the equivalent data blocks of the component 304 using recovery write instructions. When all the identified data blocks have been copied, the component 304 has been synchronized with component 302 and is up to date, such that it is in an active state at T15.

It should be understood that, while the synchronization bitmap of component 302 does include a record for all changes to the data blocks that were missed by the component 304 since it became unavailable at LSN 15, it also includes a record of changes made between LSN 9 and LSN 15, which the data blocks of component 304 already reflect. As a result, synchronizing data blocks based on the synchronization bitmap may result in one or more data blocks being copied to the component 304 unnecessarily due to the equivalent data blocks of component 304 being already up to date. This occurrence of unnecessary I/O may be considered "write amplification", which may result in the synchronization process requiring more processing and/or time resources than would otherwise be necessary. As a result, in other examples where an active mirrored component includes a tracking bitmap associated with the stale LSN of 15, such a tracking bitmap may be prioritized for use in a synchronization process for the component 304, as any write amplification in the process may be reduced or eliminated by using a tracking bitmap with a stale LSN that matches the stale LSN associated with the component 304. However, because the component 302 is the only active mirrored component, the presence of the synchronization bitmap enables the system to synchronize the component 304 from the component 302, even though the component 302 was not available when the component 304 became unavailable.

Figure 4:
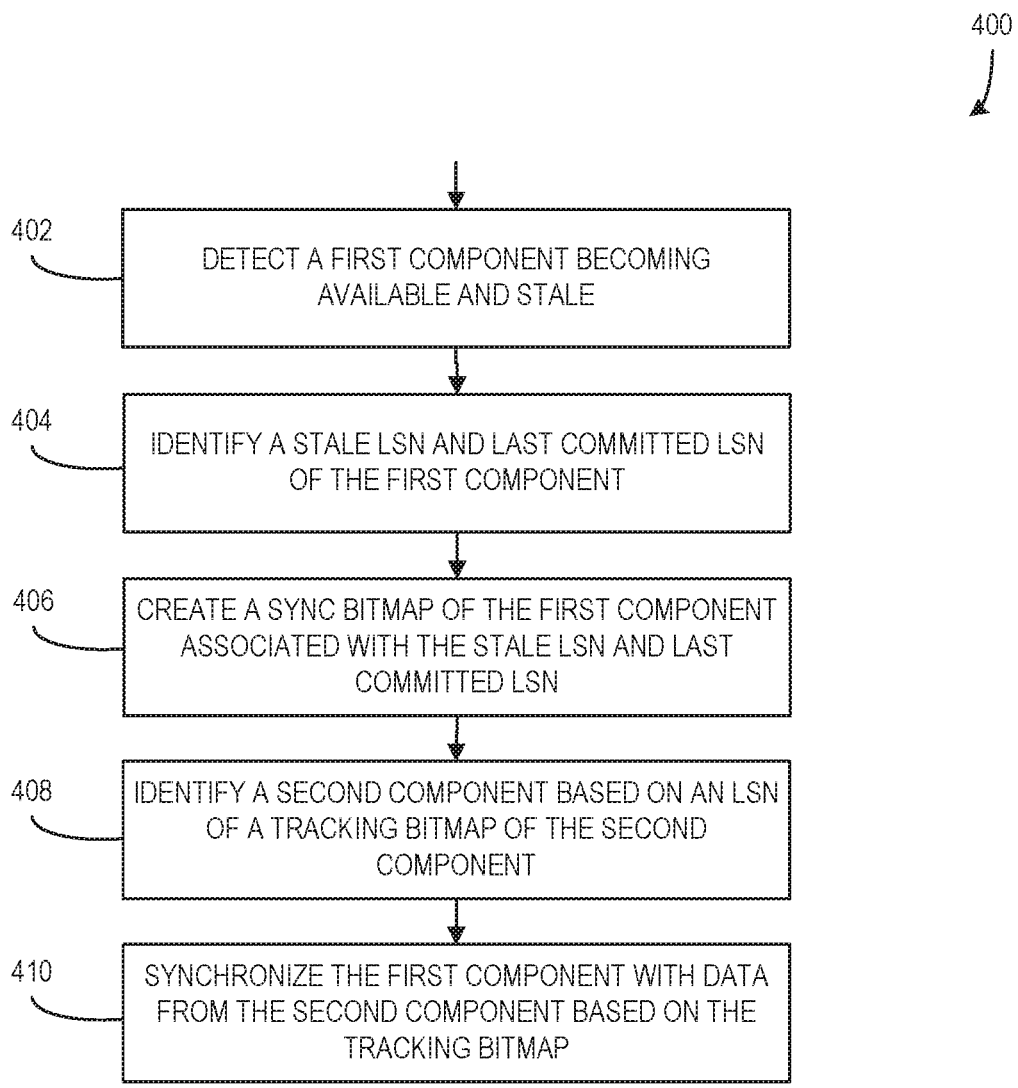
FIG. 4 is a flowchart illustrating a process for tracking a synchronization of a stale component of a distributed data object according to an embodiment.

FIG. 4 is a flowchart illustrating a process 400 for tracking a synchronization of a stale component of a distributed data object according to an embodiment. In some examples, the process 400 is executed or otherwise performed on a component or components of a system such as system 100 of FIG. 1 and/or systems 200A-D of FIGS. 2A-D as described herein. At 402, a first component of a distributed data object becomes available after having been unavailable (e.g., due to hardware failure, networking failure, maintenance of an associated host device, or the like). The first component is stale with respect to other mirrored components of the distributed data object in that one or more write I/Os have occurred while the first component was unavailable and the data blocks of the first component do not reflect changes associated with the one or more write I/Os.

At 404, a stale LSN and last committed LSN of the first component are identified. The staleness of the first component may be determined based on a last committed LSN of the first component and/or based on a stale LSN with which the first component is associated.

At 406, a synchronization bitmap of the first component is created and associated with an inclusive LSN range from the identified stale LSN to the last committed LSN. In many cases, the stale LSN and last committed LSN are the same value, but in other cases, a write I/O may be committed to a component immediately prior to it becoming unavailable, such that other components do not have access to the information that the write I/O has been committed to the now-unavailable component. In such cases, the last committed LSN may reflect one or more additional committed write I/Os than the stale LSN, which is determined based on the LSNs of write I/Os committed to the mirrored components generally prior to detecting the unavailability of the component. The synchronization bitmap is configured to track changes made to the first component after the last committed LSN thereof, including the recovery writes that occur during a synchronization operation as described herein and any write I/Os that may cause data block changes to the first component from the point it becomes available. As previously described, in some examples, new write I/Os are not sent to stale components, so the first component would not receive new write I/Os to be recorded in the synchronization bitmap until after synchronization is complete and the first component becomes active again. Additionally, a locking mechanism may be used to protect the states of the data blocks used in the synchronization to protect the process from data corruption and ensure that the recovery writes are performed as atomic operations.

At 408, a second component of the distributed data object is identified based on an LSN of an associated tracking bitmap. The second component is selected for the upcoming synchronization process based on it being active (e.g., it is available and up-to-date) and based on it having a tracking bitmap that includes a record of changed data blocks starting at least at the stale LSN associated with the first component. In some examples, the second component and associated tracking bitmap are identified and/or selected based on an LSN of the tracking bitmap matching the stale LSN associated with the first component. Alternatively, or additionally, if a component with a tracking bitmap that is associated with a matching LSN is not available, a different component with a tracking bitmap associated with an LSN that is less than the stale LSN of the first component may be identified and/or selected for use in the synchronization process (e.g., the tracking bitmap includes a record of all changes made with respect to write I/Os from earlier than the write I/O with which the stale LSN is associated).

At 410, the first component is synchronized with data from the second component based on the tracking bitmap of the second component. The synchronizing includes copying changed data blocks, as indicated by the tracking bitmap, from the second component to the equivalent data blocks of the first component. Further, the synchronization bitmap of the first component is updated based on the data blocks of the first component that are being changed. In some examples, the synchronization is performed using recovery write operations that are performed in an order based on logical address of the changed data blocks (e.g., the changed data blocks are copied to the first component from lowest logical address to highest logical address). When the synchronization is complete, the first component is brought up to date and is no longer stale and the synchronization bitmap includes a record of all changes made to the first component from the stale LSN of the first component onward (e.g., including the recovery writes that occurred during the synchronization and/or write I/Os that occur during and/or after the synchronization).

In further examples, a third component in a stale state may become available and the first component may be identified and selected for use during synchronization based on the synchronization bitmap that was previously created and populated as described above. The first component may be selected if the stale LSN of the third component is equal to or greater than the inclusive LSN range of the synchronization bitmap of the first component, meaning that the third component became unavailable at or after the same time that the first component became unavailable. Even if the first component was unavailable when the third component became unavailable, the synchronization bitmap now includes a record of all changed data blocks during the time period that the first component was unavailable, including the time period during which the third component was unavailable.

The third component is synchronized with data from the first component based on changed data blocks indicated in the synchronization bitmap of the first bitmap. As with the synchronization of the first bitmap described above, the synchronization of the third component from the first component includes updating a synchronization bitmap of the third component to track changes made to data blocks of the third component during the synchronization process.

Figure 5:
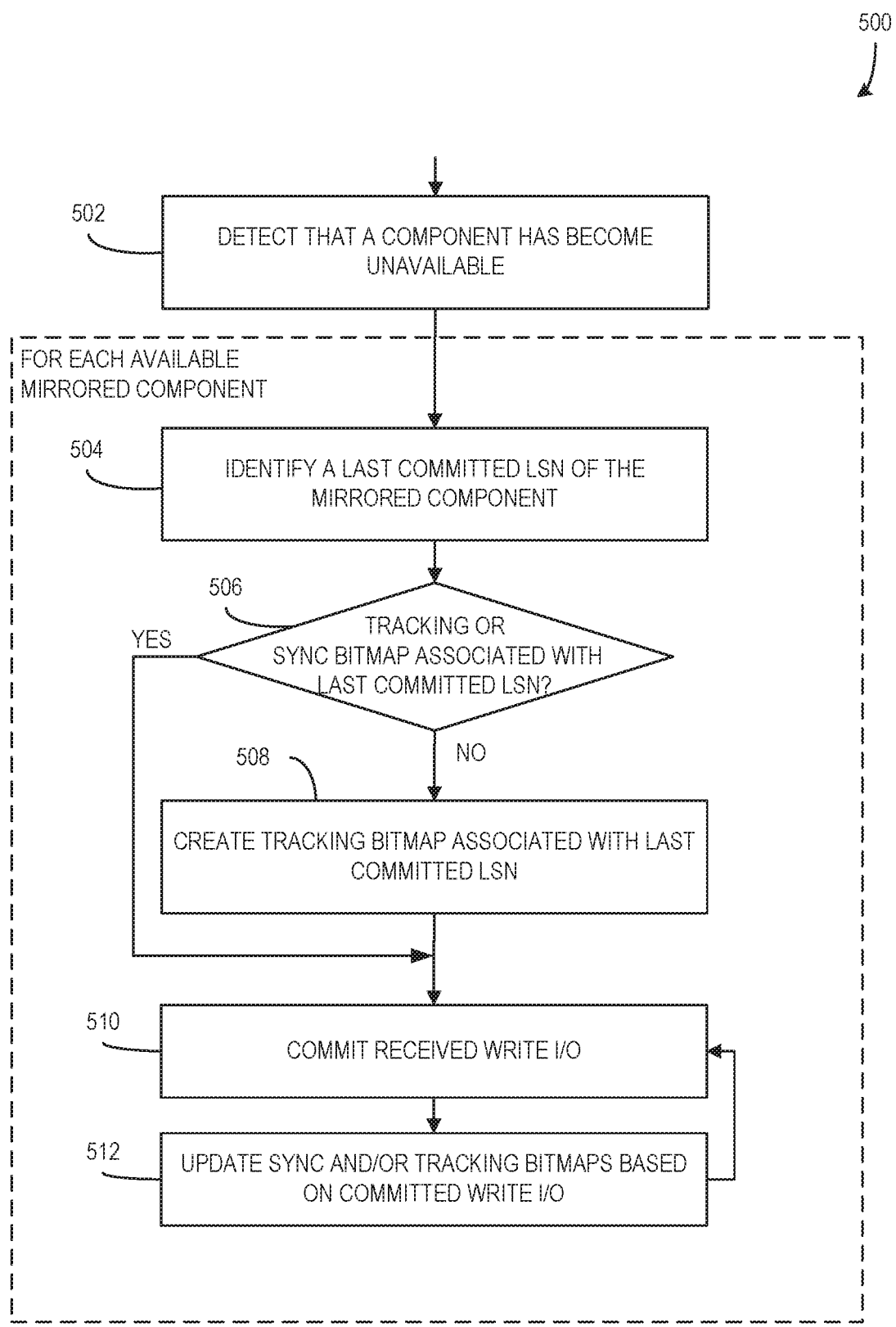
FIG. 5 is a flowchart illustrating a process for managing tracking and synchronization bitmaps of available mirrored components based on a component becoming unavailable according to an embodiment.

FIG. 5 is a flowchart illustrating a process 500 for managing tracking and synchronization bitmaps of available mirrored components based on a component becoming unavailable according to an embodiment. In some examples, the process 500 is executed or otherwise performed on a component or components of a system such as system 100 of FIG. 1 and/or systems 200A-D of FIGS. 2A-D as described herein. At 502, it is detected that a component of the distributed data object has become unavailable. In some examples, the component may become unavailable due to hardware failure, networking failure, a host device associated with the component transitioning to a maintenance mode, or the like. The detection that the component has become unavailable may be based on a notification received from an associated host device and/or on a failure by the component to respond to a message from another entity of the system (e.g., a polling message from a managing entity of the distributed data object).

Based on the component becoming unavailable, for each available mirrored component of the distributed data object, the process from 504 to 512 is performed. At 504, a last committed LSN of the mirrored component is identified. This last committed LSN may be considered the stale LSN of the unavailable component and used to determine how to bring the unavailable component back up to date during a future synchronization process as described herein. In some examples, the available mirrored components may identify the same last committed LSN, as they are generally synchronized with each other, but in other examples, one or more of the available mirrored components may identify different last committed LSNs based on the timing of the described processes occurring.

At 506, if the mirrored component has or is associated with a tracking bitmap or a synchronization bitmap associated with the identified last committed LSN, the process proceeds to 510. Alternatively, if the mirrored component does not have or is not associated with a tracking bitmap or a synchronization bitmap associated with the identified last committed LSN, the process proceeds to 508. In some examples, the mirrored component has been synchronized during a synchronization process after a downtime and, as a result, it includes a synchronization bitmap associated with an inclusive LSN range (e.g., the component 302 of FIG. 3 at and after T8). If the identified last committed LSN of the mirrored component is within that inclusive LSN range, then the existing synchronization bitmap should sufficiently track changes to the mirrored component during the downtime of the unavailable component and no new tracking bitmap is created at 508. Alternatively, or additionally, if the mirrored component already has or is already associated with a tracking bitmap that is associated with the identified last committed LSN (e.g., the tracking bitmap was already created due to another component becoming unavailable), this tracking bitmap is also sufficient to track changes to the mirrored component and no new tracking bitmap is created at 508.

If the mirrored component does not include a bitmap of any type associated with the identified last committed LSN, at 508, a tracking bitmap associated with the last committed LSN is created (e.g., the components 304, 306, and 308 of FIG. 3 at T3). The created tracking bitmap is configured to track changes to data blocks of the mirrored component starting immediately with the next committed write I/O after the write I/O associated with the identified last committed LSN. After the tracking bitmap is created, the process proceeds to 510.

At 510, when the mirrored component commits a received write I/O, the mirrored component updates the synchronization and/or tracking bitmaps based on the committed write I/O. In some examples, the updating includes setting bits of the bitmap associated with data blocks that are changed based on the committed write I/O, as described herein. Multiple write I/Os may be committed by the mirrored component and associated updates to the bitmaps may be made during the downtime of the unavailable component. When the unavailable component becomes available again, a synchronization process, such as the process 400 of FIG. 4, is initiated to bring it up to date with the rest of the available mirrored components. Further, it should be understood that synchronization and/or tracking bitmaps may be created and/or maintained on most or all available mirrored components of the distributed data object during the process 500, such that there are redundant bitmaps that include complete records of changes made during the downtime of the unavailable component, significantly increasing the likelihood that an effective, efficient synchronization process may be performed to bring the currently unavailable component back up to date.

Exemplary Operating Environment

Figure 6:
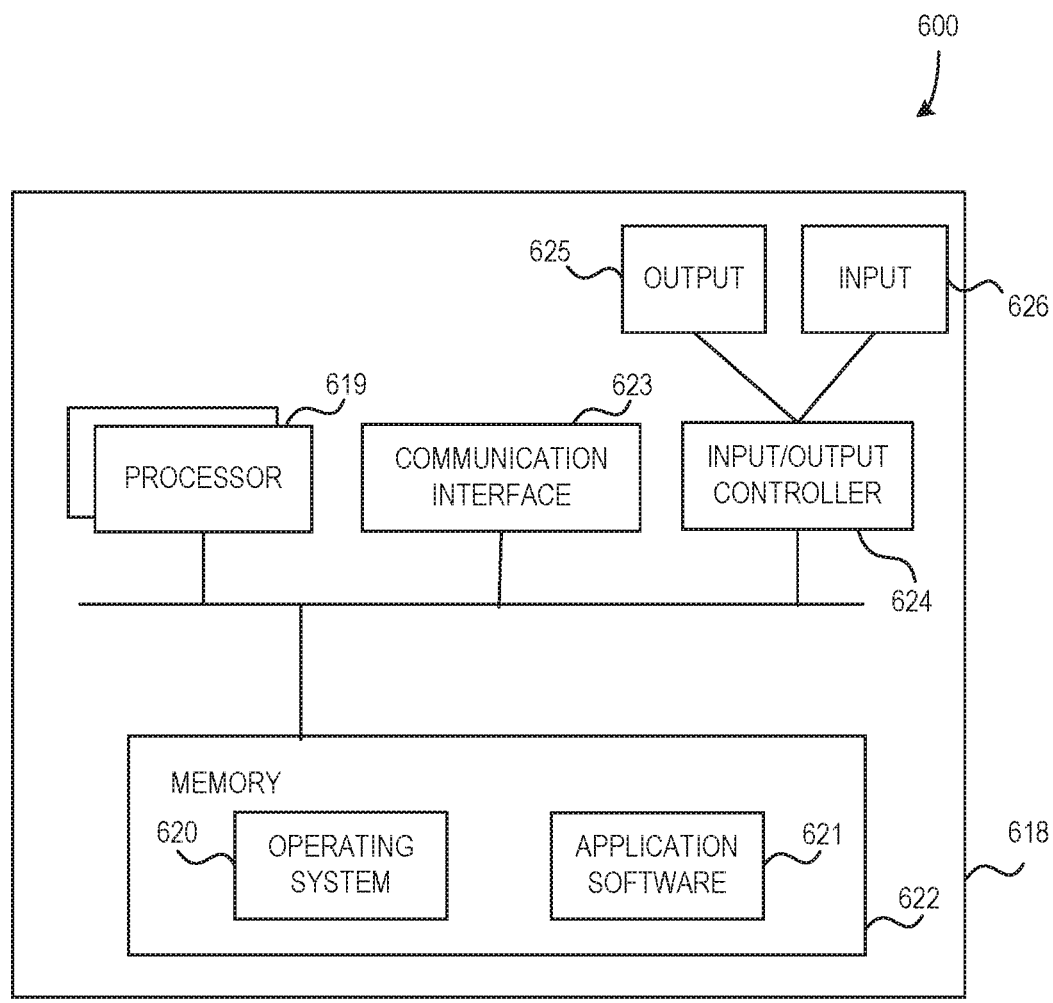
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, tracking component changes during a synchronization process using synchronization bitmaps and using the synchronization bitmaps during synchronization processes as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for synchronizing a stale component of a distributed data object comprises: a processor; and a non-transitory computer readable medium having stored thereon program code for transferring data to another computer system, the program code causing the processor to: detect a first component of a plurality of mirrored components of the distributed data object becoming available from an unavailable state, wherein the first component is stale with respect to at least one active component of the plurality of mirrored components; identify a stale log sequence number (LSN) and a last committed LSN associated with the first component, wherein the stale LSN is an LSN associated with a write I/O that was committed by at least one active component of the plurality of mirrored components prior to the first component transitioning to the unavailable state and the last committed LSN is an LSN associated with a last write I/O that was committed to the first component prior to the first component transitioning to the unavailable state; create a synchronization bitmap of the first component associated with an inclusive LSN range from the identified stale LSN to the identified last committed LSN, wherein the synchronization bitmap is configured to track changes to data blocks of the first component that occur after the first component becomes available; identify a second component of the plurality of mirrored components based on the second component including a tracking bitmap associated with an LSN that is equal to or less than the stale LSN of the first component; and synchronize the first component with data from the second component based on changed data blocks indicated in the tracking bitmap included in the second component, wherein the synchronizing includes updating the synchronization bitmap to track changes made to data blocks of the first component, whereby the first component is synchronized with the second component such that it is no longer stale and the synchronization bitmap tracks changes made to the first component during synchronization.

An example method for synchronizing a stale component of a distributed data object comprises detecting, by a processor, a first component of a plurality of mirrored components of the distributed data object becoming available from an unavailable state, wherein the first component is stale with respect to at least one active component of the plurality of mirrored components; identifying, by the processor, a stale log sequence number (LSN) and a last committed LSN associated with the first component, wherein the stale LSN is an LSN associated with a write I/O that was committed by at least one active component of the plurality of mirrored components prior to the first component transitioning to the unavailable state and the last committed LSN is an LSN associated with a last write I/O that was committed to the first component prior to the first component transitioning to the unavailable state; creating, by the processor, a synchronization bitmap of the first component associated with an inclusive LSN range from the identified stale LSN to the identified last committed LSN, wherein the synchronization bitmap is configured to track changes to data blocks of the first component that occur after the first component becomes available; identifying, by the processor, a second component of the plurality of mirrored components based on the second component including a tracking bitmap associated with an LSN that is equal to or less than the stale LSN of the first component; and synchronizing, by the processor, the first component with data from the second component based on changed data blocks indicated in the tracking bitmap included in the second component, wherein the synchronizing includes updating the synchronization bitmap to track changes made to data blocks of the first component, whereby the first component is synchronized with the second component such that it is no longer stale and the synchronization bitmap tracks changes made to the first component during synchronization.

A non-transitory computer storage medium has stored thereon program code executable by a first computer system at a first site, wherein the program code embodies a method comprising: detecting, by a processor, a first component of a plurality of mirrored components of a distributed data object becoming available from an unavailable state, wherein the first component is stale with respect to at least one active component of the plurality of mirrored components; identifying, by the processor, a stale log sequence number (LSN) and a last committed LSN associated with the first component, wherein the stale LSN is an LSN associated with a write I/O that was committed by at least one active component of the plurality of mirrored components prior to the first component transitioning to the unavailable state and the last committed LSN is an LSN associated with a last write I/O that was committed to the first component prior to the first component transitioning to the unavailable state; creating, by the processor, a synchronization bitmap of the first component associated with an inclusive LSN range from the identified stale LSN to the identified last committed LSN, wherein the synchronization bitmap is configured to track changes to data blocks of the first component that occur after the first component becomes available; identifying, by the processor, a second component of the plurality of mirrored components based on the second component including a tracking bitmap associated with an LSN that is equal to or less than the stale LSN of the first component; and synchronizing, by the processor, the first component with data from the second component based on changed data blocks indicated in the tracking bitmap included in the second component, wherein the synchronizing includes updating the synchronization bitmap to track changes made to data blocks of the first component, whereby the first component is synchronized with the second component such that it is no longer stale and the synchronization bitmap tracks changes made to the first component during synchronization.

Alternatively, or in addition to the other examples described herein, examples include any combination of the following:

detecting, by the processor, the first component of the plurality of mirrored components transitioning into the unavailable state prior to the first component becoming available; based on detecting the first component transitioning into the unavailable state, creating, by the processor, the tracking bitmap in the second component; associating, by the processor, a last committed LSN of the second component with the tracking bitmap; and wherein the tracking bitmap is updated based on a data block of the second component being changed.

based on detecting the first component transitioning into the unavailable state, for each available component of the plurality of mirrored components, creating a tracking bitmap of the component and associating a last committed LSN of the component with the created tracking bitmap.

detecting, by the processor, a third component of the plurality of mirrored components becoming available from an unavailable state, wherein the third component is stale with respect to at least one active component of the plurality of mirrored components; identifying, by the processor, a stale LSN and a last committed LSN associated with the third component; creating, by the processor, a synchronization bitmap of the third component associated with an inclusive LSN range of the identified stale LSN associated with the third component to the identified last committed LSN associated with the third component, wherein the synchronization bitmap of the third component is configured to track changes to data blocks of the third component that occur after the third component becomes available; identifying, by the processor, the first component of the plurality of mirrored components based on the first component including the synchronization bitmap of the first component associated with the inclusive LSN range of the synchronization bitmap of the first component that includes an LSN equal to or less than the stale LSN of the third component; and synchronizing, by the processor, the third component with data from the first component based on changed data blocks indicated in the synchronization bitmap of the first component, wherein the synchronizing includes updating the synchronization bitmap of the third component to track changes made to data blocks of the third component.

detecting, by the processor, the second component becoming unavailable; and based on detecting the second component becoming unavailable and determining that the last committed LSN of the first component is in the inclusive LSN range of the synchronization bitmap of the first component, maintaining the synchronization bitmap of the first component, such that the synchronization bitmap of the first component tracks changes made to the first component while the second component is unavailable.

committing, by the processor, to the first component, a write I/O associated with an LSN that is outside of the inclusive LSN range of the synchronization bitmap of the first component, wherein the last committed LSN of the first component is set to the LSN with which the committed write I/O is associated; and based on detecting the second component of the plurality of mirrored components becoming unavailable and determining that the last committed LSN of the first component is outside the inclusive LSN range of the synchronization bitmap of the first component, creating, by the processor, a tracking bitmap of the first component, wherein the tracking bitmap of the first component is associated with the last committed LSN of the first component.

wherein synchronizing the first component with data from the second component based on changed data blocks indicated in the tracking bitmap of the second component further includes performing recovery write operations for copying each of changed data blocks indicated in the tracking bitmap of the second component from the second component to equivalent data blocks of the first component in an order based on logical addresses of the data blocks.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means detecting, by a processor, a first component of a plurality of mirrored components of the distributed data object becoming available from an unavailable state, wherein the first component is stale with respect to at least one active component of the plurality of mirrored components; exemplary means for identifying, by the processor, a stale log sequence number (LSN) and a last committed LSN associated with the first component, wherein the stale LSN is an LSN associated with a write I/O that was committed by at least one active component of the plurality of mirrored components prior to the first component transitioning to the unavailable state and the last committed LSN is an LSN associated with a last write I/O that was committed to the first component prior to the first component transitioning to the unavailable state; exemplary means for creating, by the processor, a synchronization bitmap of the first component associated with an inclusive LSN range of the identified stale LSN to the identified last committed LSN, wherein the synchronization bitmap is configured to track changes to data blocks of the first component that occur after the first component becomes available; exemplary means for identifying, by the processor, a second component of the plurality of mirrored components based on the second component including a tracking bitmap associated with an LSN that is equal to or less than the stale LSN of the first component; and exemplary means for synchronizing, by the processor, the first component with data from the second component based on changed data blocks indicated in the tracking bitmap included in the second component, wherein the synchronizing includes updating the synchronization bitmap to track changes made to data blocks of the first component, whereby the first component is synchronized with the second component such that the first component is no longer stale and the synchronization bitmap tracks changes made to the first component during synchronization.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for synchronizing a stale component of a distributed data object, the method comprising:
    detecting, by a processor, a first component of a plurality of mirrored components of the distributed data object becoming available from an unavailable state, wherein the first component is stale with respect to at least one active component of the plurality of mirrored components, the at least one active component remaining available when the first component was in the unavailable state;
    identifying, by the processor, a stale log sequence number (LSN) and a last committed LSN associated with the first component, wherein the stale LSN is of a write I/O that was committed on all active components of the plurality of mirrored components; prior to the first component transitioning to the unavailable state, and wherein the last committed LSN is of a last write I/O that was committed only to the first component prior to the first component transitioning to the unavailable state;
    creating, by the processor, a synchronization bitmap of the first component, the synchronization bitmap including an inclusive LSN range from the identified stale LSN to the identified last committed LSN, wherein the synchronization bitmap is configured to track changes to data blocks of the first component that occur after the first component becomes available;
    identifying, by the processor, a second component of the plurality of mirrored components based on the second component including a tracking bitmap associated with an LSN that is less than the stale LSN of the first component; and
    synchronizing, by the processor, the first component with data from the second component based on changed data blocks indicated in the tracking bitmap included in the second component, wherein the synchronizing includes updating the synchronization bitmap to track changes made to data blocks of the first component, whereby the first component is synchronized with the second component such that the first component is no longer stale and the synchronization bitmap tracks changes made to the first component during synchronization.

2. The method of claim 1, further comprising:
    detecting, by the processor, the first component of the plurality of mirrored components transitioning into the unavailable state prior to the first component becoming available;
    based on detecting the first component transitioning into the unavailable state, creating, by the processor, the tracking bitmap in the second component;
    associating, by the processor, a last committed LSN of the second component with the tracking bitmap; and
    wherein the tracking bitmap is updated based on a data block of the second component being changed.

3. The method of claim 1, further comprising:
    preventing, by the processor, a new write I/O from being sent to the first component while the first component is receiving recovery writes, the recovery writes comprising the data from the second component being written to the first component.

4. The method of claim 1, further comprising:
    detecting, by the processor, a third component of the plurality of mirrored components becoming available from an unavailable state, wherein the third component is stale with respect to the at least one active component;
    identifying, by the processor, a stale LSN and a last committed LSN associated with the third component;
    creating, by the processor, a synchronization bitmap of the third component associated with an inclusive LSN range of the identified stale LSN associated with the third component to the identified last committed LSN associated with the third component, wherein the synchronization bitmap of the third component is configured to track changes to data blocks of the third component that occur after the third component becomes available;
    identifying, by the processor, the first component of the plurality of mirrored components based on the first component including the synchronization bitmap of the first component associated with the inclusive LSN range of the synchronization bitmap of the first component that includes an LSN equal to or less than the stale LSN of the third component; and
    synchronizing, by the processor, the third component with data from the first component based on changed data blocks indicated in the synchronization bitmap of the first component, wherein the synchronizing includes updating the synchronization bitmap of the third component to track changes made to data blocks of the third component.

5. The method of claim 1, wherein the synchronization bitmap being configured to track changes to data blocks of the first component that occur after the first component becomes available comprises tracking changes to data blocks of the first component that occur upon synchronizing data blocks of the first component with equivalent data blocks of the second component.

6. The method of claim 1, further comprising:
committing, by the processor, to the first component, a write I/O associated with an LSN that is outside of the inclusive LSN range of the synchronization bitmap of the first component, wherein the last committed LSN of the first component is set to the LSN with which the committed write I/O is associated; and
based on detecting the second component of the plurality of mirrored components becoming unavailable and determining that the last committed LSN of the first component is outside the inclusive LSN range of the synchronization bitmap of the first component, creating, by the processor, a tracking bitmap of the first component, wherein the tracking bitmap of the first component is associated with the last committed LSN of the first component.

7. The method of claim 1, wherein synchronizing the first component with data from the second component based on changed data blocks indicated in the tracking bitmap of the second component further includes copying changed data blocks from the second component to corresponding data blocks in the first component in an increasing order of logical addresses of the changed data blocks.

8. A computer system for synchronizing a stale component of a distributed data object, the computer system comprising:
a processor; and
a non-transitory computer readable medium having stored thereon program code for transferring data to another computer system, the program code causing the processor to:
detect a first component of a plurality of mirrored components of the distributed data object becoming available from an unavailable state, wherein the first component is stale with respect to at least one active component of the plurality of mirrored components, the at least one active component remaining available when the first component was in the unavailable state;
identify a stale log sequence number (LSN) and a last committed LSN associated with the first component, wherein the stale LSN is of a write I/O that was committed on all active components of the plurality of mirrored components, prior to the first component transitioning to the unavailable state, and wherein the last committed LSN is of a last write I/O that was committed only to the first component prior to the first component transitioning to the unavailable state;
create a synchronization bitmap of the first component, the synchronization bitmap including an inclusive LSN range from the identified stale LSN to the identified last committed LSN, wherein the synchronization bitmap is configured to track changes to data blocks of the first component that occur after the first component becomes available;
identify a second component of the plurality of mirrored components based on the second component including a tracking bitmap associated with an LSN that is less than the stale LSN of the first component; and
synchronize the first component with data from the second component based on changed data blocks indicated in the tracking bitmap included in the second component, wherein the synchronizing includes updating the synchronization bitmap to track changes made to data blocks of the first component, whereby the first component is synchronized with the second component such that the first component is no longer stale and the synchronization bitmap tracks changes made to the first component during synchronization.

9. The computer system of claim 8, wherein the program code is further operative to:
detect the first component of the plurality of mirrored components transitioning into the unavailable state prior to the first component becoming available;
based on detecting the first component transitioning into the unavailable state, create the tracking bitmap in the second component;
associate a last committed LSN of the second component with the tracking bitmap; and
wherein the tracking bitmap is updated based on a data block of the second component being changed.

10. The computer system of claim 8, wherein the program code is further operative to:
prevent a new write I/O from being sent to the first component while the first component is receiving recovery writes, the recovery writes comprising the data from the second component being written to the first component.

11. The computer system of claim 8, wherein the program code is further operative to:
detect a third component of the plurality of mirrored components becoming available from an unavailable state, wherein the third component is stale with respect to the at least one active component;
identify a stale LSN and a last committed LSN associated with the third component;
create a synchronization bitmap of the third component associated with an inclusive LSN range of the identified stale LSN associated with the third component to the identified last committed LSN associated with the third component, wherein the synchronization bitmap of the third component is configured to track changes to data blocks of the third component that occur after the third component becomes available;
identify the first component of the plurality of mirrored components based on the first component including the synchronization bitmap of the first component associated with the inclusive LSN range of the synchronization bitmap of the first component that includes an LSN equal to or less than the stale LSN of the third component; and
synchronize the third component with data from the first component based on changed data blocks indicated in the synchronization bitmap of the first component, wherein the synchronizing includes updating the synchronization bitmap of the third component to track changes made to data blocks of the third component.

12. The computer system of claim 8, wherein the synchronization bitmap being configured to track changes to data blocks of the first component that occur after the first component becomes available comprises tracking changes to data blocks of the first component that occur upon synchronizing data blocks of the first component with equivalent data blocks of the second component.

13. The computer system of claim 8, wherein the program code is further operative to:
commit, to the first component, a write I/O associated with an LSN that is outside of the inclusive LSN range of the synchronization bitmap of the first component, wherein the last committed LSN of the first component is set to the LSN with which the committed write I/O is associated; and
based on detecting the second component of the plurality of mirrored components becoming unavailable and determining that the last committed LSN of the first component is outside the inclusive LSN range of the synchronization bitmap of the first component, create a tracking bitmap of the first component, wherein the tracking bitmap of the first component is associated with the last committed LSN of the first component.

14. The computer system of claim 8, wherein synchronizing the first component with data from the second component based on changed data blocks indicated in the tracking bitmap of the second component further includes copying changed data blocks from the second component to corresponding data blocks in the first component in an increasing order of logical addresses of the changed data blocks.

15. A non-transitory computer storage medium having stored thereon program code executable by a first computer system at a first site, the program code embodying a method comprising:
  detecting, by a processor, a first component of a plurality of mirrored components of a distributed data object becoming available from an unavailable state, wherein the first component is stale with respect to at least one active component of the plurality of mirrored components, the at least one active component remaining available when the first component was in the unavailable state;
  identifying, by the processor, a stale log sequence number (LSN) and a last committed LSN associated with the first component, wherein the stale LSN is of a write I/O that was committed on all active components of the plurality of mirrored components prior to the first component transitioning to the unavailable state, and wherein the last committed LSN is of a last write I/O that was committed only to the first component prior to the first component transitioning to the unavailable state;
  creating, by the processor, a synchronization bitmap of the first component the synchronization bitmap including an inclusive LSN range from the identified stale LSN to the identified last committed LSN, wherein the synchronization bitmap is configured to track changes to data blocks of the first component that occur after the first component becomes available;
  identifying, by the processor, a second component of the plurality of mirrored components based on the second component including a tracking bitmap associated with an LSN that is equal to or less than the stale LSN of the first component; and
  synchronizing, by the processor, the first component with data from the second component based on changed data blocks indicated in the tracking bitmap included in the second component, wherein the synchronizing includes updating the synchronization bitmap to track changes made to data blocks of the first component, whereby the first component is synchronized with the second component such that the first component is no longer stale and the synchronization bitmap tracks changes made to the first component during synchronization.

16. The computer storage medium of claim 15, wherein the program code further comprises:
  detecting the first component of the plurality of mirrored components transitioning into the unavailable state prior to the first component becoming available;
  based on detecting the first component transitioning into the unavailable state, creating the tracking bitmap in the second component;
  associating a last committed LSN of the second component with the tracking bitmap; and
  wherein the tracking bitmap is updated based on a data block of the second component being changed.

17. The computer storage medium of claim 16, wherein the program code further comprises:
  preventing, by the processor, a new write I/O from being sent to the first component while the first component is receiving recovery writes, the recovery writes comprising the data from the second component being written to the first component.

18. The computer storage medium of claim 15, wherein the program code further comprises:
  detecting a third component of the plurality of mirrored components becoming available from an unavailable state, wherein the third component is stale with respect to the at least one active component;
  identifying a stale LSN and a last committed LSN associated with the third component;
  creating a synchronization bitmap of the third component associated with an inclusive LSN range of the identified stale LSN associated with the third component to the identified last committed LSN associated with the third component, wherein the synchronization bitmap of the third component is configured to track changes to data blocks of the third component that occur after the third component becomes available;
  identifying the first component of the plurality of mirrored components based on the first component including the synchronization bitmap of the first component associated with the inclusive LSN range of the synchronization bitmap of the first component that includes an LSN equal to or less than the stale LSN of the third component; and
  synchronizing the third component with data from the first component based on changed data blocks indicated in the synchronization bitmap of the first component, wherein the synchronizing includes updating the synchronization bitmap of the third component to track changes made to data blocks of the third component.

19. The computer storage medium of claim 15, wherein the synchronization bitmap being configured to track changes to data blocks of the first component that occur after the first component becomes available comprises tracking changes to data blocks of the first component that occur upon synchronizing data blocks of the first component with equivalent data blocks of the second component.

20. The computer storage medium of claim 15, wherein the program code further comprises:
  committing, to the first component, a write I/O associated with an LSN that is outside of the inclusive LSN range of the synchronization bitmap of the first component, wherein the last committed LSN of the first component is set to the LSN with which the committed write I/O is associated; and
  based on detecting the second component of the plurality of mirrored components becoming unavailable and determining that the last committed LSN of the first component is outside the inclusive LSN range of the synchronization bitmap of the first component, creating a tracking bitmap of the first component, wherein the tracking bitmap of the first component is associated with the last committed LSN of the first component.

* * * * *